United States Patent [19]
Goodhue

[11] Patent Number: 5,926,937
[45] Date of Patent: Jul. 27, 1999

[54] MOBILE APPARATUS FOR PLACEMENT OF ANGLE PLATES IN TRANSVERSE DUCT FLANGES

[75] Inventor: William V. Goodhue, North Kingstown, R.I.

[73] Assignee: Systemation, Incorporated, Warwick, R.I.

[21] Appl. No.: 09/018,728

[22] Filed: Feb. 4, 1998

[51] Int. Cl.[6] .................................................. B21D 39/00
[52] U.S. Cl. ................................ 29/509; 29/715; 29/818; 29/243.5
[58] Field of Search .............................. 29/897.3, 407.09, 29/407.1, 509, 513, 714, 715, 818, 243.5, 243.58, 252

[56] References Cited

U.S. PATENT DOCUMENTS

| | | |
|---|---|---|
| 2,978,706 | 4/1961 | Moberg ...................................... 29/818 |
| 5,283,944 | 2/1994 | Goodhue ................................. 29/243.5 |
| 5,375,312 | 12/1994 | Sakurai et al. .......................... 29/243.5 |
| 5,495,652 | 3/1996 | Kitamura et al. ....................... 29/243.5 |
| 5,621,956 | 4/1997 | Kolesar ................................... 29/243.5 |
| 5,649,347 | 7/1997 | Cattadoris ................................. 29/252 |
| 5,661,899 | 9/1997 | Ayres ........................................ 29/818 |

*Primary Examiner*—David P. Bryant
*Attorney, Agent, or Firm*—Breiner & Breiner

[57] ABSTRACT

An apparatus for inserting angle plates or corners into channel flanges of ducts which is compact and mobile is described. The apparatus includes wheels for portability and a corner supply magazine which is in essentially a vertical position or an angle position relative to a base plate to permit utilization of the device in various environments and which permits the device to be utilized with duct sections having various shapes. The apparatus operates on a controlled cycle and once the cycle is started, a sequence of operations is automatically performed until the angle plate is inserted into the flange and crimped.

14 Claims, 6 Drawing Sheets

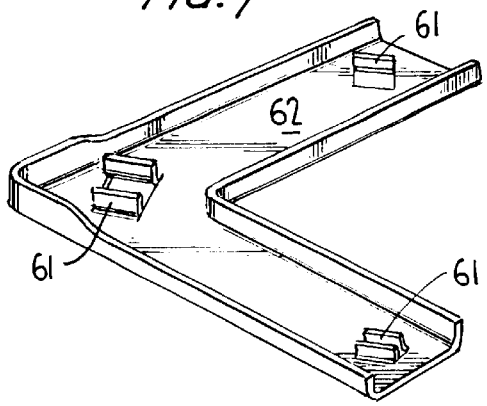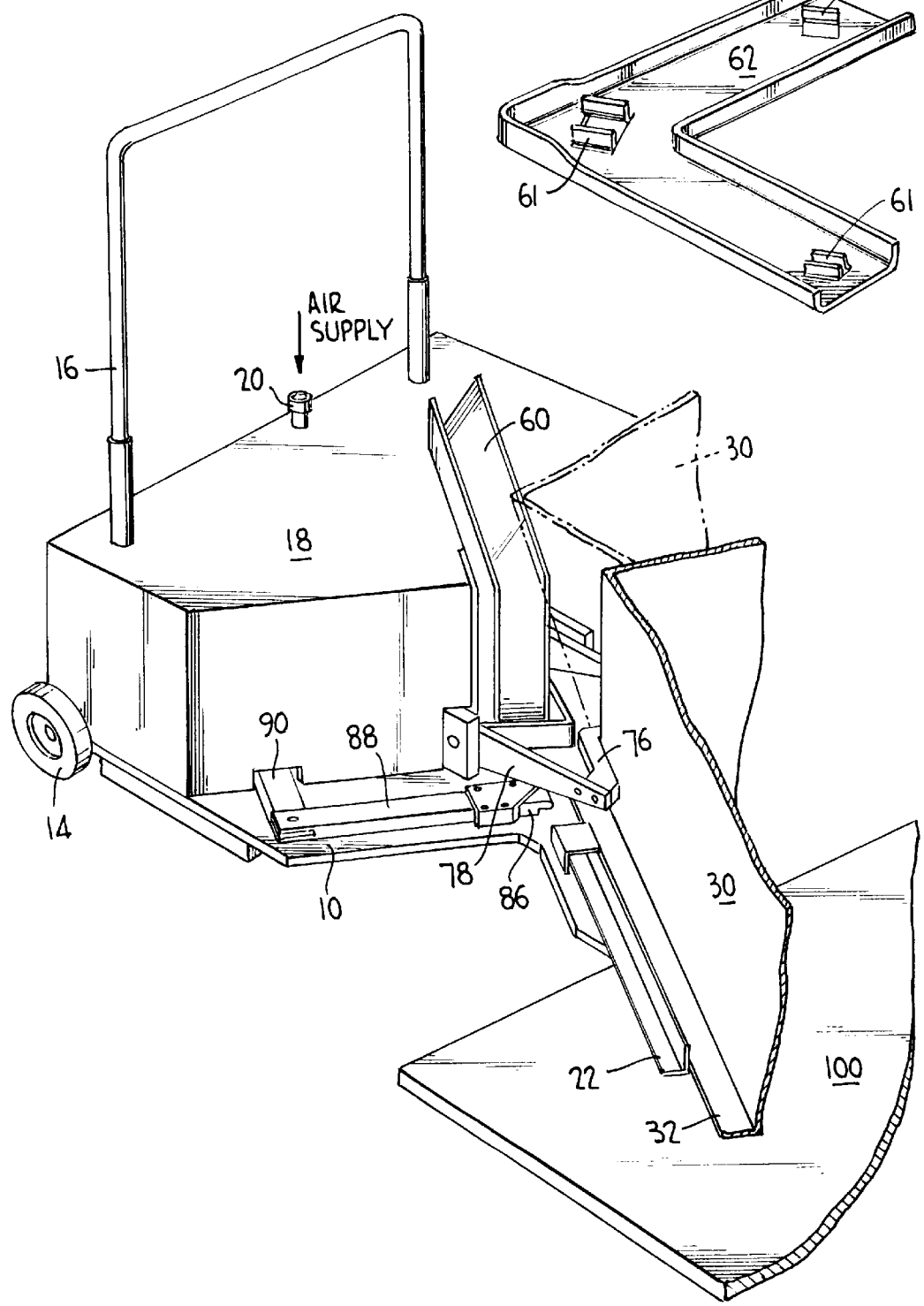

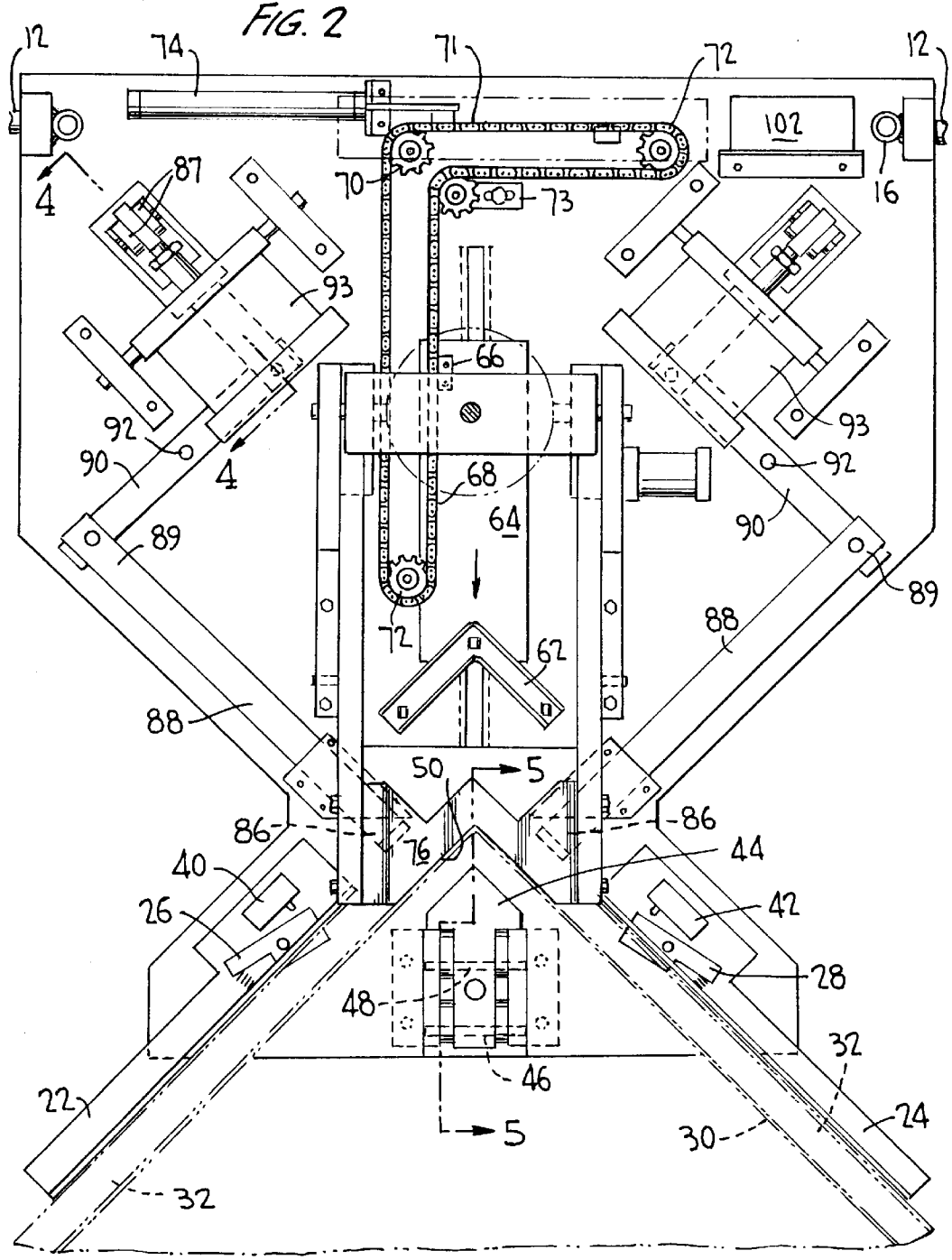

MOBILE APPARATUS FOR PLACEMENT OF ANGLE PLATES IN TRANSVERSE DUCT FLANGES

RELATED PATENTS

This application is related to William V. Goodhue U.S. Pat. Nos. 5,283,944; 5,321,880 and 5,342,100.

FIELD OF INVENTION

This invention relates to the placement of angle plates into a corner defined by channel flanges at the ends of panels of a duct of a conventional type. More specifically, the invention relates to a mobile apparatus for and the method of automatically placing angle plates into channel flanges of ducts once a duct is positioned relative to the apparatus.

BACKGROUND OF INVENTION

It is known to connect the ends of sheet metal ducts by providing the ducts at opposite ends of the panels of the ducts which open toward one another and wherein there is disposed at the corners of the ducts angle plates which have opposite ends thereof seated in and connect together adjacent angle flanges. The ducts are then secured together by way of fasteners which connect together the angle plates.

Systems for connecting the flanges are described in U.S. Pat. No. 4,466,641 assigned to the Lockformer Company and U.S. Pat. No. 4,579,375 assigned to Engel Industries, Inc. The system described in the Lockformer '641 patent is commonly referred to as the transverse duct connecter (TDC) system and the system described in the Engel '375 patent is commonly referred to as the transverse duct flange (TDF) system.

Prior to the issuance of related patent numbers 5,283,944 and 5,321,880 above noted, the angle plates, also referred to as corners, were manually secured to the ducts by manually forcing the angle plates into the duct channel flanges. This was a time consuming and thus costly operation since each angle plate was positioned individually. The aforesaid '944 and '880 patents describe an apparatus and method for automatically assembling an angle plate in channel shaped flanges at ends of duct panels joined in a corner to form a duct section. The apparatus includes a platen for engaging an end of a duct section, positioning means for locking a duct in a pre-selected position relative to the platen, angle plate advancing means for advancing an angle plate into engagement with a corner of a clamped duct section in axial alignment with the duct flanges, and means for pressing an angle plate into the corners. The apparatus described in the aforesaid '944 and '880 patents can be a single head machine where corners are inserted at one end of the duct section only or a dual headed machine where corners are simultaneously inserted at both ends of a duct section. The single head and dual headed machines are commercially available from Iowa Precision Industries, Cedar Rapids, Iowa, under the trademark CORNERMATIC corner inserter. These apparatus, used in a shop environment with the joined sections then transported to a job site where the duct sections are assembled for use in a heating and air conditioning system, satisfy a long felt need in the industry and have been enthusiastically received by the industry.

Subsequent to the aforesaid '944 and '880 patents, U.S. Pat. No. 5,495,652 issued also describing an apparatus for automatically inserting corners.

The present invention describes modifications to the apparatus and method described in the '944 and '880 patents wherein the apparatus is mobile permitting the use of the apparatus in field applications. Additionally, the apparatus is versatile and can be used with various shaped duct sections.

SUMMARY OF INVENTION

In accordance with the present invention, an apparatus for inserting angle plates or corners into channel flanges of ducts which is compact and mobile is described. The device of the present invention, embracing the features of the inventions described in the aforesaid '944 and '880 patents, can be utilized either in an assembly shop for assembling duct sections which are subsequently carried to a job site or it can be utilized directly at the job site. Thus, the apparatus of the invention, in addition to being compact, includes wheels for portability and a corner supply magazine which can go from an essentially vertical position at the bottom of the magazine to a rearward angle, i.e., 60°, at the top of the magazine to permit utilization of the device in various environments and which permits the device to be utilized with duct sections having various shapes.

In operation, the machine system of this invention sequentially performs steps as follows:

A duct section is positioned against guide rails. As it is positioned, two small levers, one on each guide rail, is deflected by the flange of the duct section which starts the corner insertion cycle.

At the start of the corner insertion cycle, an arrow shaped block, which normally rests flush with the surface of a base plate of the machine system, rises and moves forward to lock the duct section firmly in a "V" block of a press head.

A cylinder and cam assembly under the base plate moves a lock bar at the center which is connected by a dowel to a lock block. When the lock block is in this position, it is held and cannot be reversed because the cam reaches a point where it is on a flat and can only move by action of the cylinder.

Once the duct section is locked in place, the bottom corner plate from a magazine of corners is sliced off the bottom of the corner supply and is moved to the duct and is held in position over the duct flange. The corner plate is moved by a chain and sprocket assembly. When properly positioned over the duct flange, a press head axially presses the corner plate into the flange of the duct section.

As the corner is pressed down into the flange, crimper bars, one from each side of the corner, move in and crimp the corner into place. The crimping completes the cycle and after a short pause the duct section is released by the lock block and the duct section removed. The machine is now ready for an additional cycle.

Once the cycle is started, the operator of the device does not do anything until the cycle is completed. Everything is done automatically.

BRIEF DESCRIPTION OF THE DRAWINGS

FIG. 1 is a perspective view of the apparatus of the present invention including showing a duct section and supply magazine in phantom lines, positioned therein;

FIG. 2 is a plan view of the apparatus of FIG. 1 with the cover assembly of the apparatus removed so as to show the internal mechanism of the apparatus;

FIG. 7 is a perspective view of a angle plate or corner utilized in the apparatus illustrated in FIG. 1;

DESCRIPTION OF PREFERRED EMBODIMENT

Figure 3:
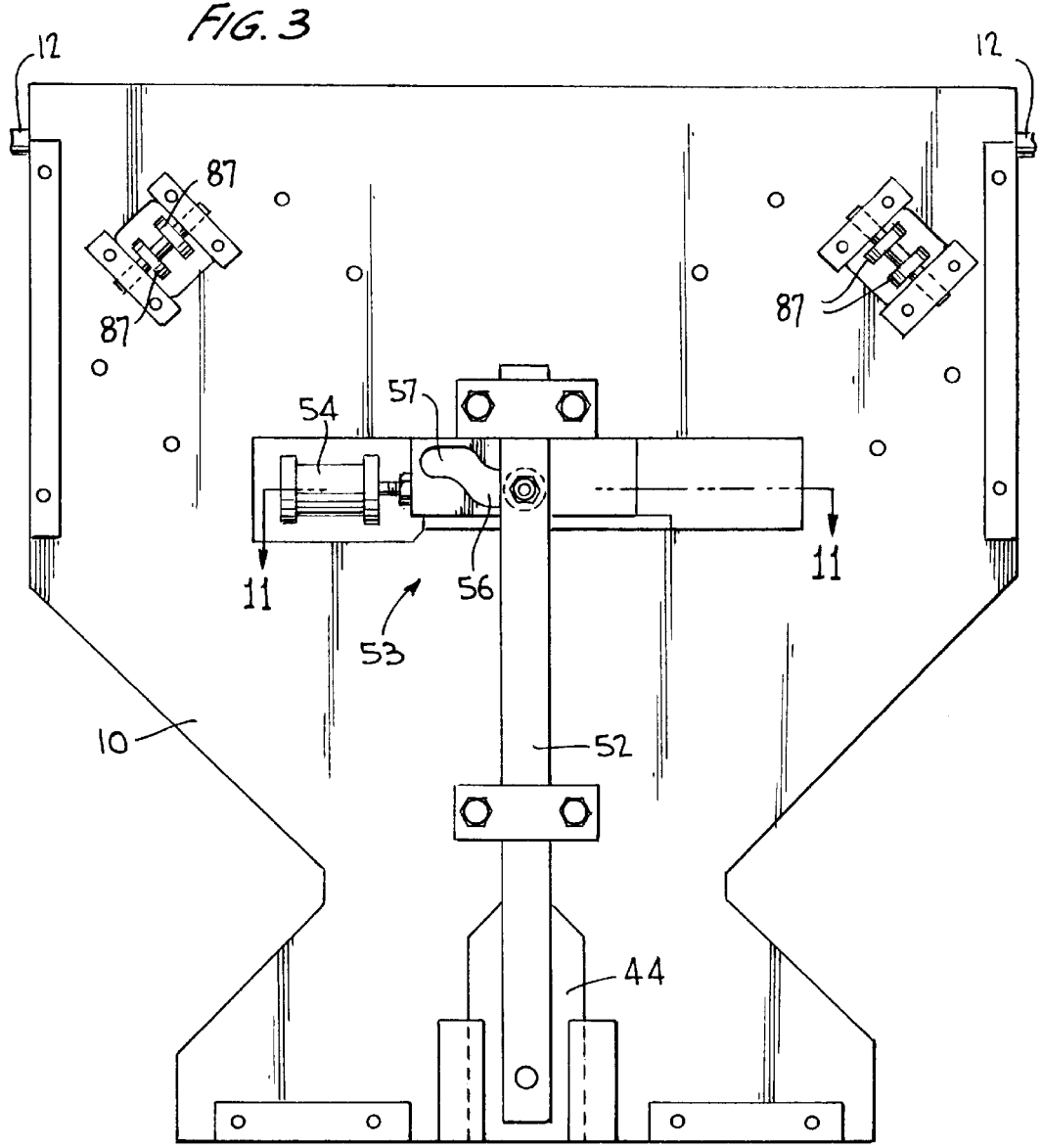
FIG. 3 is a bottom view of the base plate of the apparatus of FIGS. 1 and 2.
Figure 11:
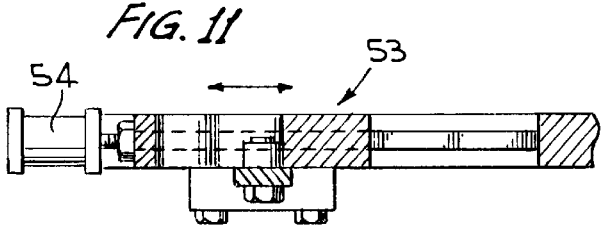
FIG. 11 is a sectional view through lines 11—11 of FIG. 3.

Referring to the drawings where like numerals refer to like parts, as best shown in FIGS. 1, 2 and 3 the apparatus comprises a base plate 10 having an axle 12 positioned at the bottom of one extreme end thereof carrying wheels 14 (only one shown) and a handle 16 extended through cover 18 relative to axle 12. This permits the convenient movement of the device from one location to another.

All functions of the device are individual actuated by separate air cylinders supplied by a common air supply 20.

As best shown in FIGS. 1 and 2, duct section 30 is positioned between left and right guide rails 22 and 24 fixed to base plate 10. Levers 26 and 28 fixedly positioned on guide rails 22 and 24 respectively, are deflected by flange 32 of duct section 30, actuating sensors 40 and 42. The simultaneous actuation of these sensors commences the corner insertion cycle.

Figure 5:
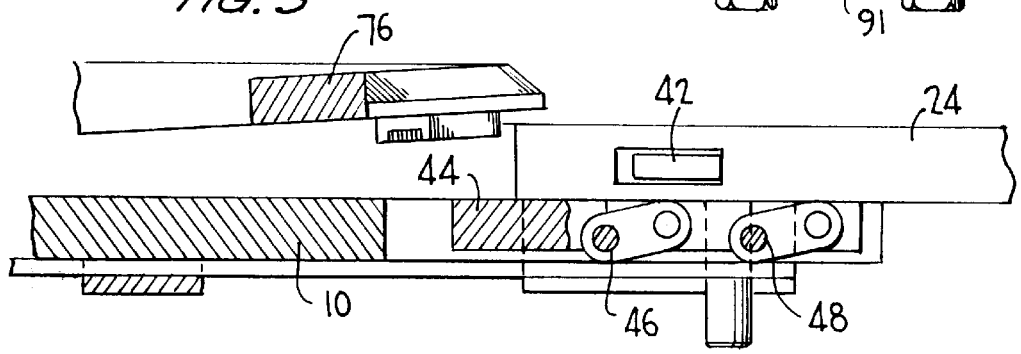
FIG. 5 is a sectional view taken along line 5—5 of FIG. 2.
Figure 6:
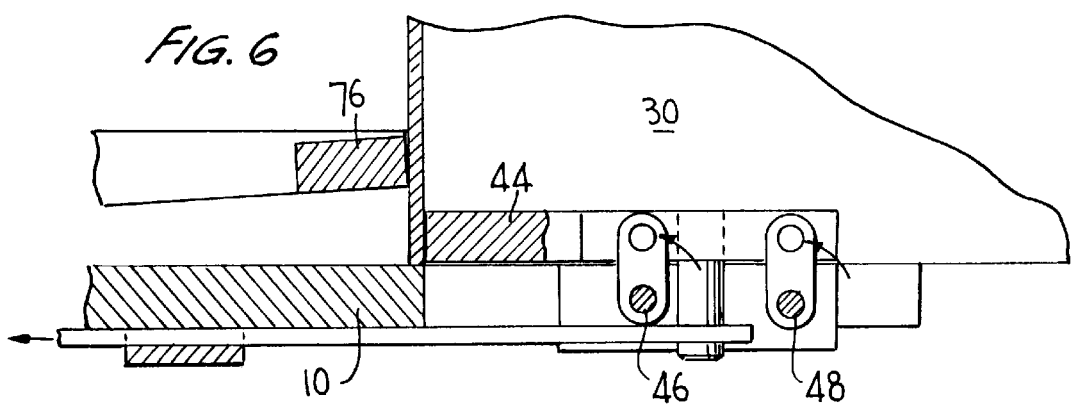
FIG. 6 is an alternative position of the mechanism shown in FIG. 5.

Arrow shaped block 44, which normally rests flush with base plate 10, as shown in FIGS. 2 and 5, rises and moves forward on dowels 46 and 48, as shown in FIG. 6, to position the duct work adjacent "V" block 50 of press head 76. The arrow shaped block is moved into position, as best shown in FIG. 3, by cylinder 54 and a lock cam mechanism 53 which rides in slot 56 which moves long bar 52. Once the bar is moved forward, it is retained in a flat surface 57 in the cam slot 56 holding block 44 so that it cannot be reversed except by actuation of cylinder 54.

Once the duct section is locked into position, sequentially, a bottom corner plate 62 of the type shown in FIG. 7, carried in a supply magazine 60, is sliced from the bottom of the supply magazine by corner carrier 64. Corner 62, as claimed in the '100 patent, has three legs 61 which prevent nesting of the corners which permits sliding of the bottom plate from the supply stack of plates in magazine 60. Corner carrier 64 is attached through a member 66 to a drive chain 68 carried on sprockets 70 and 72. The drive chain 68 is driven by feed cylinder 74 attached thereto by fastener means 71, as best shown in FIG. 2. The chain, upon wearing, can be adjusted through member 73 which essentially comprises an adjustable sprocket.

Figure 12:
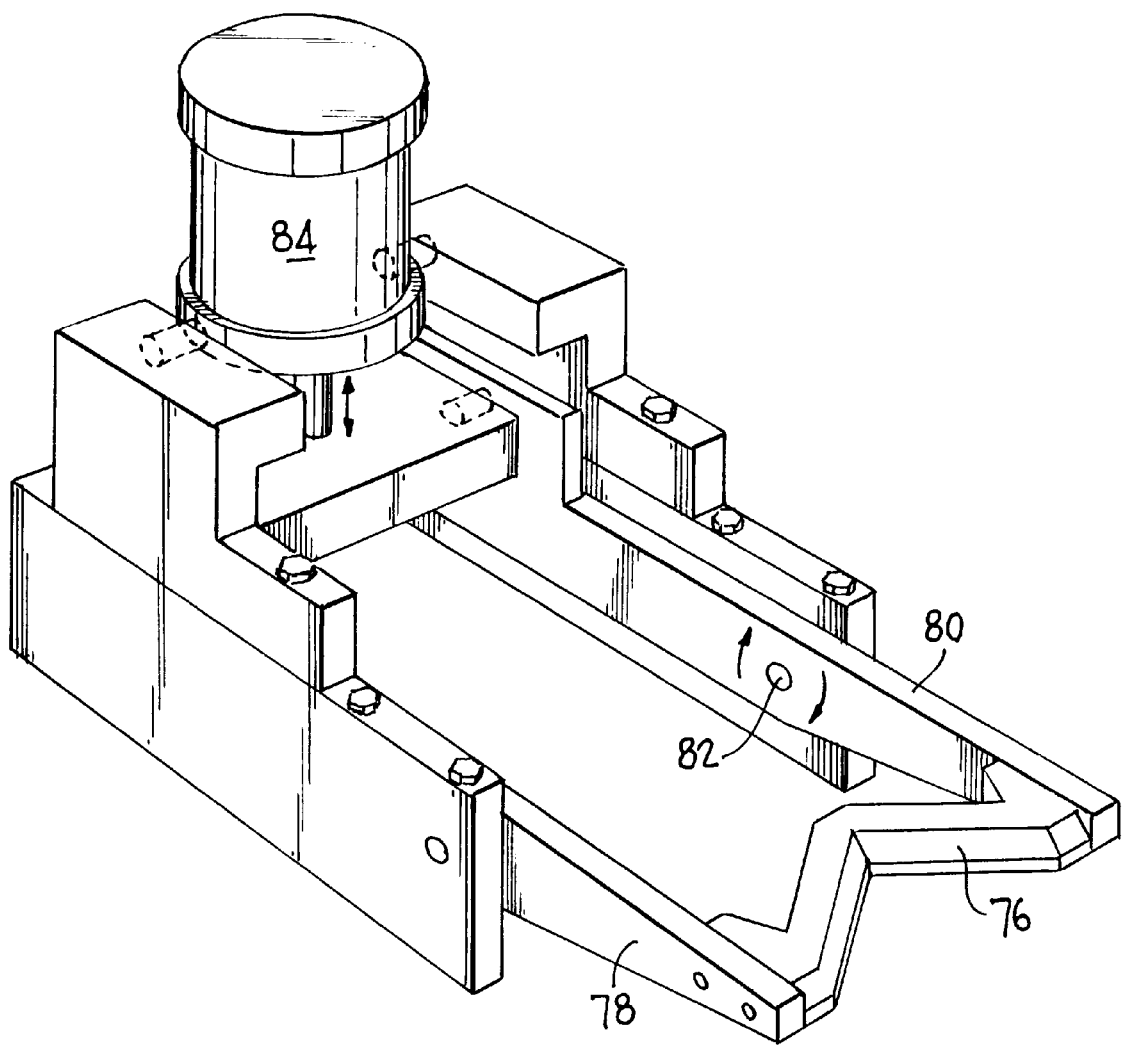
FIG. 12 is a perspective detailed view of the cylinder assembly and press arm of the device shown in FIG. 1.

As best shown in FIG. 12, the press head 76 is carried on press arms 78 and 80 which press arms are rotated at pivot point 82 by cylinder 84 which provides an up and down or vertical movement. The press head 76, therefore, provides an axial component for pressing the corner plate 62 into position in the duct flange 32.

Figure 4:
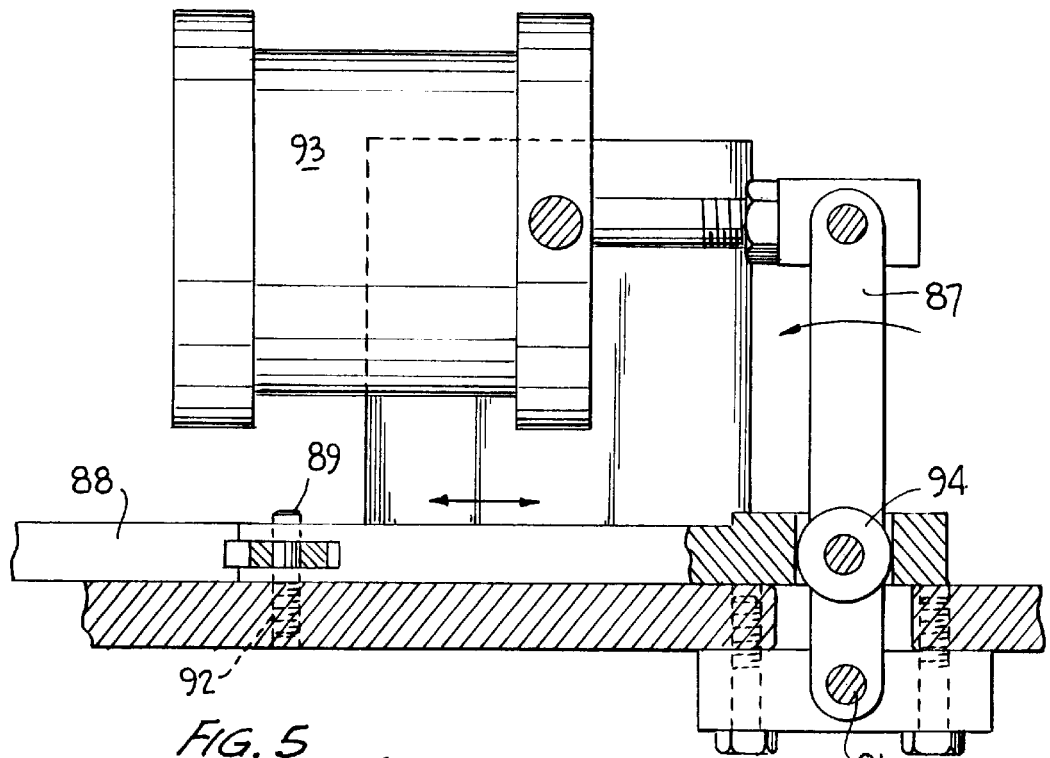
FIG. 4 is a sectional view taken along line 4—4 of FIG. 2.
Figure 8:
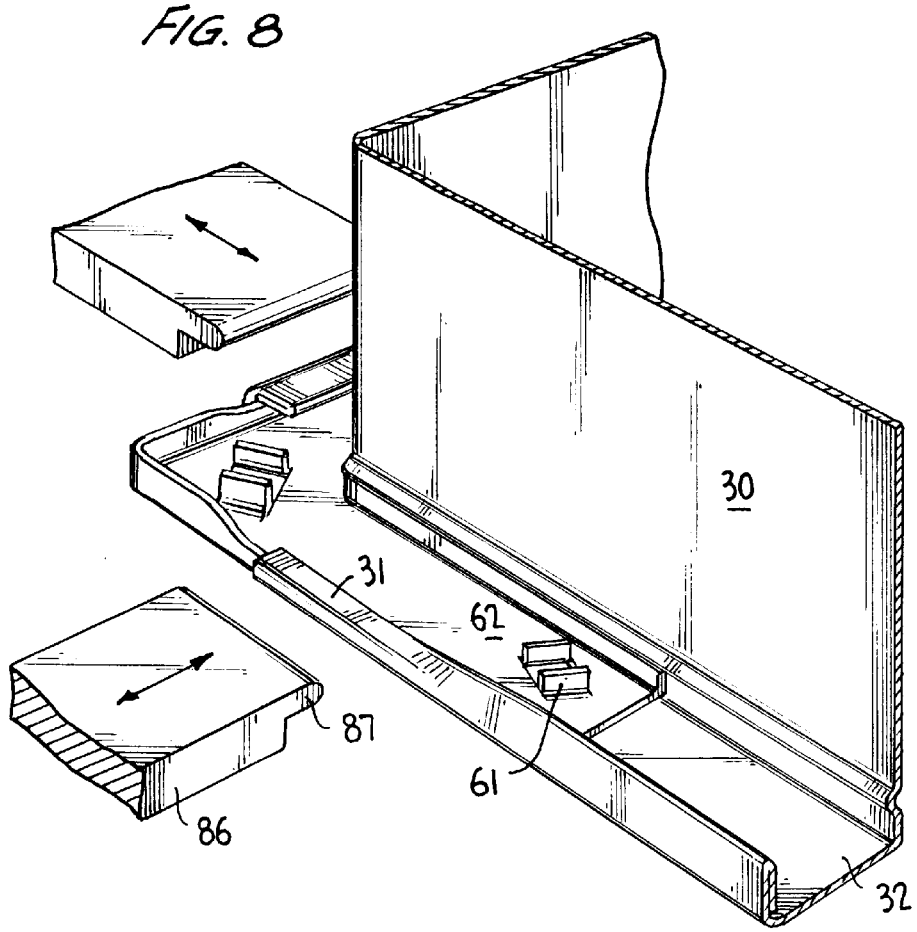
FIG. 8 is a detailed view showing the crimping operation of the device of FIG. 1.
Figure 9:
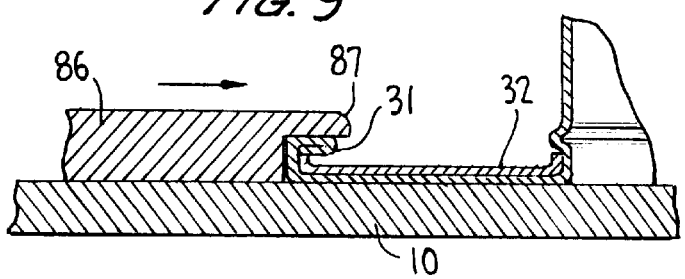
FIG. 9 is a cross section of the crimper device shown in detail in FIG. 8, in operative position.
Figure 10:
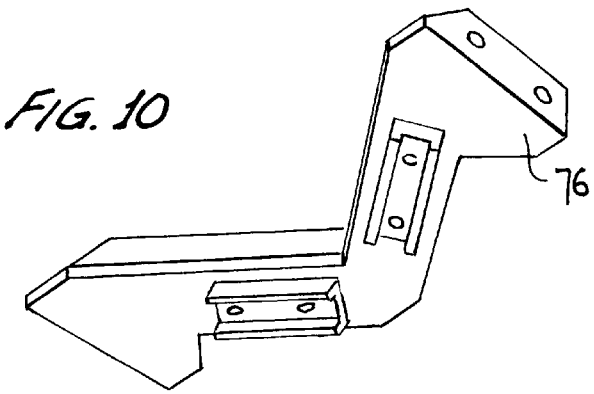
FIG. 10 is a perspective view of the bottom of the press head.

As best shown in FIGS. 2, 4 and 8, crimper bars 86 are moved through a long bar 88 attached at one end 89 to a lever 90 which pivots around point 92. Lever 90 is attached at its end opposite end 89 to pair of bars 87, through a roller 94, as shown in FIG. 4, which provide the force from cylinder 93 to drive the crimper linkage at a ratio of about 4:1. The first link pushes on the end of lever 90 to push long bar 88 which crimps the flange of the duct best shown in FIG. 8. As also shown in FIG. 8, crimper bar 86 is cut-away at its end to have an extended top 87 in order to better roll flange rib 31.

With the crimping operation complete, after a brief pause the lock bar releases and the lock block resumes its normal position flush with the base plate permitting the duct to be removed. The apparatus is again ready for starting a new cycle.

As is apparent from the above description, the corner insertion device of the present invention is completely automatic once the cycle is started. The electronics for the system are extremely simple and are contained in a single box 102 positioned on base plate 10. The electronics are known in the art and form no part of the present invention.

In a preferred embodiment of the present invention, the base plate, as best shown in FIGS. 1 and 3, is configured to have a recess in the vicinity of the guide rails. This provides an operator a place to put his feet close to the machine without interference. Moreover, in one aspect of the invention, as shown in FIG. 1, the device can be used in association with a plate 100 having substantially the same thickness as the base plate. Plate 100 can be a metal sheet or preferably a metal sheet fastened to plywood. This permits the duct work to be placed on the plate for easy movement into position between the guide rails. This is particularly useful when the device is used at the point of a building construction where finding a level surface is not always readily possible. In the preferred embodiment, the supply magazine 60, as shown in FIG. 1, extends vertical for about 4 inches and then slopes rearwardly at an angle of, for example, up to about 60°. This will permit the positioning of the corners in the supply magazine out of line with the duct section being worked and thus permits duct work of various shapes being utilized in the corner insertion operation without interference. As apparent, however, the supply magazine can extend vertically, if desired.

Moreover, although only a preferred embodiment of the angle plate positioning machine has been specifically illustrated and described, it is understood that modifications may be made therein without departing from the spirit and scope of the invention as defined in the appended claims. As a further example, the shown preferred embodiment utilizes a corner carrier driven with a chain. However, the device can be modified to utilize a gear and rack arrangement or a cable arrangement. Further, as shown, the device is operated using an air cylinder. However, the cylinder can be an hydraulic cylinder. Moreover, a different source of power for the various functions of the unit can be utilized, including reversible motors.

It is claimed:

1. An apparatus for automatically assembling angle plates into channel shaped flanges with ends of duct panels joined in a corner to form a duct section with said flanges separated by a notch, said apparatus comprising a base plate; guide rails attached to said base plate for positioning a flanged duct section; sensor means associated with said guide rails; lever means positioned on each of said guide rails constructed and arranged to be deflected by the flange of said duct section when positioned in said guide rails, and upon deflection activating said sensor means; block means on said base plate movable between a rest position and a lock position whereby a duct section positioned between said guide rails is locked into place; means for moving said block means between said rest and lock positions; a supply magazine on said base plate carrying a plurality of corners for insertion into said flanged duct sections; corner carrier means for carrying an individual corner from said magazine to a position over the flange of a duct section when a duct section is positioned on said base plate between said guide rails; presser means positioned on said base plate for axially positioning corners in flanges when said apparatus is activated, and crimper means on said base plate for crimping the edge of said flange over said corners.

2. The apparatus of claim 1 wherein said sensor means are integral with said guide rails and said guide rails are adjustable.

3. The apparatus of claim 1 wherein said base plate has axle means associated therein, and wheels mounted on said axle means.

4. The apparatus of claim 3 wherein handle means are positioned relative to said axle.

5. The device of claim 4 wherein said corner carrier means comprises a chain and sprocket assembly actuated with cylinder means.

6. The apparatus of claim 5 wherein said sprocket and chain means includes means for adjusting said chain.

7. The device of claim 1 wherein said block means on said base plate is moved between a rest position and a locked position by a slidable cam assembly actuated with a cylinder.

8. The device of claim 1 wherein said crimper means comprises a crimper bar constructed and arranged with lever means associated with a cylinder means for applying force to said crimper means.

9. The apparatus of claim 8 wherein said crimper bar at the crimper end is cut away to have an extended top for engagement with the top of the flange to be crimped.

10. The apparatus of claim 1 wherein said supply magazine is vertically positioned relative to the base plate.

11. The apparatus of claim 1 wherein the supply magazine is positioned vertically for a first distance and then at an angle for a second distance relative to the base plate.

12. The apparatus of claim 11 wherein said angle is an angle of approximately 60°.

13. The apparatus of claim 1 wherein all functions of the apparatus are powered by separate air cylinders.

14. A method of assembling angle plates at corners of ducts into channel shaped flanges at ends of duct panels joined at a corner; said method comprising the sequential steps of (i) placing a plurality of angle plates in a supply magazine associated with a base plate; (ii) positioning a duct section having channel shaped flanges at an end of said duct section between guide rails on said base plate; (iii) locking said duct section in position on said base plate between said guide rails; (iv) carrying a single angle plate taken from the bottom of said supply magazine to a position above the channel shaped flanges of said duct section; (v) pressing said angle plate into said flange; (vi) crimping said flange of said duct section over said angle plate.

* * * * *